US011375388B2

(12) United States Patent
Kloper et al.

(10) Patent No.: US 11,375,388 B2
(45) Date of Patent: *Jun. 28, 2022

(54) OBTAINING ACCURATE MEASUREMENTS OF A CHANNEL PARAMETER BY A MULTI-RADIO DEVICE WITH A CO-LOCATED INTERFERING RADIO

(71) Applicant: Cisco Technology, Inc., San Jose, CA (US)

(72) Inventors: David Kloper, Santa Clara, CA (US); Julan Hsu, San Jose, CA (US); Hari Rangarajan, San Jose, CA (US); Paul Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/685,984

(22) Filed: Aug. 24, 2017

(65) Prior Publication Data

US 2017/0353881 A1 Dec. 7, 2017

Related U.S. Application Data

(63) Continuation of application No. 13/943,425, filed on Jul. 16, 2013, now Pat. No. 9,794,810.

(51) Int. Cl.
*H04W 24/10* (2009.01)
*H04W 24/08* (2009.01)

(52) U.S. Cl.
CPC ........... *H04W 24/08* (2013.01); *H04W 24/10* (2013.01)

(58) Field of Classification Search
CPC . H04W 72/1215; H04W 36/20; H04W 88/06; H04W 72/1284; H04W 24/08; H04W 24/10
See application file for complete search history.

(56) References Cited

U.S. PATENT DOCUMENTS 6,165,534 A 12/2000 Luzio et al.
6,842,460 B1 * 1/2005 Olkkonen ............. H04W 48/16
370/328

(Continued)

FOREIGN PATENT DOCUMENTS

CN 102461310 A 5/2012
CN 102652442 A 8/2012

(Continued)

OTHER PUBLICATIONS

Nokia Siemens Networks et al., "IDC Considerations for MDT", 3GPP Draft; R2-124423 IDC and MDT, 3rd Generation Partnership Project (3GPP), vol. RAN WG2, No. 1, Sep. 28, 2012, http://www.3gpp.org/ftp/tsg_ran/WG2_RL_2/TSGR2_79bis/Docs/.

(Continued)

*Primary Examiner* — Thinh D Tran
(74) *Attorney, Agent, or Firm* — Patterson + Sherdan, LLP (57) ABSTRACT

In an example embodiment disclosed herein there is described a multi-radio device which comprises a first radio that first radio comprises a transmitter, and a second radio that second radio comprises a receiver that monitors a channel to obtain data representative of a predefined channel parameter. The second radio is operable to receive a signal from the first radio that indicates when the transmitter of the first radio is transmitting. The receiver of the second radio selectively excludes data representative of a predefined channel parameter based on whether the transmitter of the first radio is transmitting.

21 Claims, 5 Drawing Sheets

(56) References Cited

U.S. PATENT DOCUMENTS

| | | |
|---|---|---|
| 2006/0067245 A1 | 3/2006 | Pearl |
| 2011/0176430 A1 | 7/2011 | Zetterberg et al. |
| 2012/0164948 A1* | 6/2012 | Narasimha ........ H04W 72/1215 455/63.1 |
| 2012/0207040 A1* | 8/2012 | Comsa .............. H04W 72/1215 370/252 |
| 2012/0252442 A1* | 10/2012 | Fu ........................ H04W 24/10 455/426.1 |
| 2012/0281563 A1* | 11/2012 | Comsa ................. H04W 24/10 370/252 |
| 2013/0195013 A1* | 8/2013 | Ahn ................. H04W 72/1215 370/328 |
| 2014/0153482 A1* | 6/2014 | Schmidt ................ H04W 72/12 370/328 |
| 2014/0160955 A1* | 6/2014 | Lum ..................... H04W 24/06 370/252 |
| 2014/0321313 A1* | 10/2014 | Seo ......................... H04J 11/00 370/252 |
| 2015/0148050 A1 | 5/2015 | Siomina et al. |

FOREIGN PATENT DOCUMENTS

| | | |
|---|---|---|
| CN | 103155647 A | 6/2013 |
| WO | 2012061765 A1 | 5/2012 |
| WO | 2012088270 A1 | 6/2012 |

OTHER PUBLICATIONS

"3rd Generation Partnership Project; Technical Specification Group Radio Access Networks; Evolved Universal Terrestrial Radio Access (E-UTRA); Study on signaling and procedure for interference avoidance for in-device coexistence; (Release 10)", 3GPP Standard; vol. RAN WG2, No. v1.1.1, Mar. 5, 2011, pp. 1-39.

International Search Report and Written Opinion for International Application No. PCT/US2014/046818 dated Nov. 10, 2014.

Dual Radio 802.11A, Product Spec Sheet (Printed Jul. 2012).

* cited by examiner

OBTAINING ACCURATE MEASUREMENTS OF A CHANNEL PARAMETER BY A MULTI-RADIO DEVICE WITH A CO-LOCATED INTERFERING RADIO

CROSS-REFERENCE TO RELATED APPLICATIONS

This application is a continuation of co-pending U.S. patent application Ser. No. 13/943,425, filed Jul. 16, 2013. The aforementioned related patent application is herein incorporated by reference in its entirety.

TECHNICAL FIELD

The present disclosure relates generally to devices with multiple radios.

BACKGROUND

RF monitoring is useful for determining channel conditions. Measurements that are of interest can include, but are not limited to channel noise (e.g., noise floor level), CCA (Clear Channel Assessment, e.g., how busy is the channel), and Wi-Fi packet metrics, such as Packet Error Rate (PER) and/or Bit Error Rate (BER). Channel measurements can be fed into various algorithms that optimize the power and/or the operating channel of access points. If two radios are too closely located to each other, the transmit (TX) power from one radio (the first radio) can completely deafen the receiving (RX) ability of the other radio (the second radio) while the first radio is transmitting, resulting in invalid measurements, even if the radios operate on different channels of the same frequency band.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment there is disclosed herein an apparatus, comprising a first radio and a second radio. The first radio comprises a transmitter, and the second radio comprises a receiver. The receiver of the second radio selectively monitors a channel to obtain data representative of a predefined channel parameter. The receiver of the second radio is operable to receive a signal from the first radio, the signal from the first radio providing data indicating whether the transmitter of the first radio is transmitting. The receiver of the second radio selectively excludes measurements of the predefined channel parameter while the transmitter of the first radio is transmitting.

In accordance with an example embodiment, there is disclosed herein logic encoded in a non-transitory, tangible computer readable medium for execution by a processor and, when executed by the processor, the logic being operable to obtain from a receiver data representative of a measured channel condition parameter. The logic is further operable to obtain data indicating whether a co-located transmitter is transmitting. The logic selectively discards the data representative of the measured channel condition parameter while the co-located transmitter is transmitting. The logic aggregates the data representative of the measured channel condition.

In accordance with an example embodiment, there is disclosed herein a method, comprising obtaining by a receiver measurements of a channel condition. A signal is received, the signal indicating whether a transmitter that is co-located with the receiver is transmitting. The method aggregates the measurements of the channel condition while the signal indicating whether the transmitter that is co-located with the receiver is transmitting indicates the transmitter is not transmitting, and ignores the measurements of the channel condition while the signal indicating whether the transmitter that is co-located with the receiver is transmitting indicates the transmitter is transmitting.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, signaling is employed between two radios (e.g., a first radio and a second radio) that enables the radios to determine when the other radio is transmitting. For example, a signal can be sent by a first (transmitting) radio to the second (receiving radio) that can allow the second radio to determine when the first radio is transmitting. In particular embodiments, a signal can be sent by the first radio that indicates to the second radio when the first radio's power amplifier (PA) is active.

In an example embodiment, a counter, or hardware register receives the signal from the first radio and can be employed to determine whether samples obtained during a sampling period were affected. For example, the hardware register can be employed to ascertain whether a sample within the predefined sampling period (e.g., 1 ms) was affected by transmissions from the first radio. The hardware register can provide cumulative transmission time statistics for the first radio. The samples may be accumulated over a predefined overall or aggregated time period. In an example embodiment, the predefined overall or aggregated time period comprises a series of discrete timer intervals. For example, a 1 s overall time period can be selectively divided into smaller windows of time for sampling (e.g., 1 ms). At the end of a sampling period (e.g., 1 ms in this example), the hardware register (which monitors the radios that could affect sampling) is read to derive how much time the radios were transmitting during the 1 ms sampling period. If the transmission time is determined to be less than a predefined threshold such as a predefined threshold relative to the duration (here 1 ms) of the sampling period, the 1 ms sampling period is considered useful, and instantaneous measurements (such as noise and CCA, PER, BER) of that sampling window are considered "good samples". Otherwise, the 1 ms sampling window is considered blanked out and measurements for that sampling period are considered "bad samples" and discarded. Note that the predefined overall or aggregated time period (1 s in the example) and/or the sampling period (1 ms in the example) can be any suitable time period as deemed necessary or desired.

In an example embodiment, channel monitoring processing may be suppressed during transmission from other selected radios. This eliminates measurements for the exact time period of the transmission instead of (e.g., 1 ms) rounding up to the quantized periods.

In an example embodiment, where the peak transmit power is known, and the difference between the tuned frequencies of the first and second radios is known, the impairment caused by transmissions from the first radio to the second radio are determined so that de-sensed data can be selectively accepted while the first radio is transmitting. For example, in Spectral Intelligence purposes or for interference detection, Fast Fourier Transform (FFT) bins can be ignored where the spectral mask of a transmission is expected to be above a predefined level on the second radio. As another example, the noise floor estimate is selectively raised while the first radio is transmitting to prevent the transmissions from the first radio from being confused with other types of interference. Blanking samples while the first radio is transmitting not only helps to prevent reporting the transmissions of a first radio as interference, but are also selectively used to keep or otherwise maintain two radios on the same channel and/or different frequencies in the same band from confusing each other's transmissions as radar signals.

The example embodiments described herein are useful in mitigating problems caused when two radios are located within a close enough proximity to each other such that the TX power from the first radio deafens (or otherwise interferes with) the second radio. The example embodiments described herein are effective even when the first and second radios operate on different channels of the same frequency band.

Figure 1:
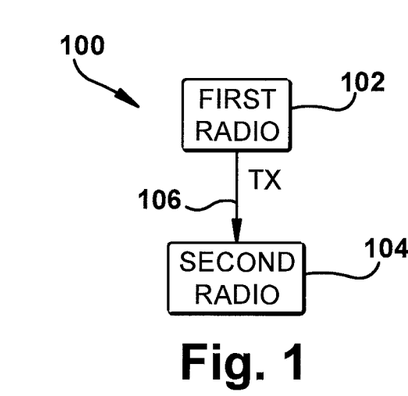
FIG. 1 is a block diagram illustrating an example of an apparatus with multiple radios upon which an example embodiment may be implemented.

FIG. 1 is a block diagram illustrating an example of an apparatus 100 with multiple radios 102, 104 upon which an example embodiment may be implemented. The first radio 104 comprises a transmitter. The second radio 104 comprises a receiver that monitors a channel to obtain data representative of a measurement of a predefined channel parameter. The predefined channel parameter can include, but is not limited to, any one, or any combination of, a clear channel assessment (CCA), channel noise floor, a bit error rate (BER), and/or packet error rate (PER). The second radio 104 is operable to receive a signal (TX) 106 from the first radio 102, wherein the signal provides data indicating whether the transmitter of the first radio 102 is transmitting. The second radio 104 selectively excludes measurements of the predefined channel parameter based on whether the transmitter of the first radio is transmitting. More particularly, in the example embodiment, the second radio 104 selectively excludes measurements of the predefined channel parameter when the transmitter of the first radio is transmitting, and uses (includes) measurements of the predefined channel parameter when the transmitter of the first radio is not transmitting.

In an example embodiment, the second radio 104 discards data representative of the predefined channel parameter obtained while the first radio 102 is transmitting. For example, the second radio 104 will discard (or ignore) any measurements made while signal 106 indicates that the first radio 102 is transmitting.

In an example embodiment, the second radio 104 obtains data representative a measurement of the predefined channel parameter during a predefined sampling period. The second radio 104 ignores data representative of measurements for the predefined channel parameter obtained during the predefined sampling period responsive to the signal 106 indicating first radio was transmitting during the sampling period.

In an example embodiment, the second radio 104 further comprises a counter that provides data representative of an amount of time the transmitter was transmitting during a sampling period. The second radio 104 ignores data representative of a measurement of the predefined channel parameter that was obtained during a sampling period responsive to determining the counter is above a predetermined threshold. In particular embodiments, the second radio 104 aggregates the data representative of the measurement of the predefined channel parameter for a predetermined time period that comprises a plurality of sampling periods. For example, the second radio may make measurements of the channel parameter for 1 ms sampling periods. The measurements can be aggregated every second (e.g., measurements that were not discarded during the one second period are aggregated). A representation of the aggregated channel parameter measurements obtained is determined in accordance with one or more suitable filters and/or filter processing. In accordance with the example embodiments, the filters include an averaging, a mean averaging, median processing, IIR, or any other statistical processing of the data now known or hereinafter developed that is useful in providing the desired representation of the aggregated channel parameter measurements. In accordance with a simple example embodiment, an average of the channel parameter measurements is obtained by dividing the aggregate of the measurements by the number of good samples. In yet additional particular embodiments, the second radio 104 determines an average for a plurality of predetermined time periods (e.g., an average of the last ten 1 second time periods, wherein each of the 1 second time periods and is suitably weighted by the number of 1 ms samples having "good" measurement data, i.e., when the first radio is not transmitting). Note that the example embodiments described herein use a 1 millisecond sampling period and a 1 second time period, however, those skilled in the art should readily appreciate this is for ease of illustration only as any suitable sampling period and/or time period may be employed.

In an example embodiment, the first radio's 102 transmitter comprises a power amplifier. The signal 106 provided to the second radio 104 is derived from the output of the power amplifier.

In an example embodiment, the transmitter of the first radio 102 comprises a power amplifier. The power amplifier includes a transmit enable input for receiving a transmit enable signal for switching power on the power amplifier. The signal provided 106 to the second radio 104 is derived from the output enable signal. However, it is to be appreciated that such a signal could also come from a T/R switch, or any other circuit that might disable or attenuate the transmission from this first radio.

In an example embodiment, the second radio 104 raises a threshold for ignoring measurements made while the first radio's 102 transmitter is transmitting. The second radio 104 excludes signals below the threshold.

In an example embodiment, the first radio 102 operates on a first channel within a band, and the second radio 104 operates on a second channel within the band. In particular embodiments, the first and second channels are the same and the radios operate in different bands. In particular further embodiments, the first and second channels are different and the radios operate in different bands. In particular still further embodiments, the first and second channels are the same and the radios operate in the same band.

Figure 2:
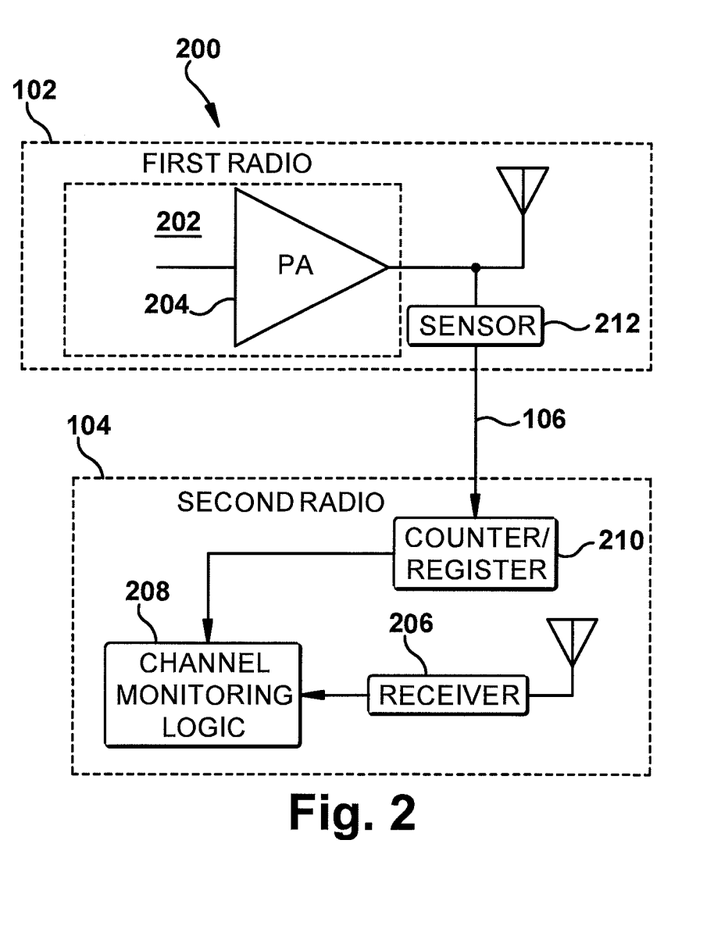
FIG. 2 is a block diagram illustrating an example of an apparatus with multiple radios where the second radio comprises a counter/register and obtains a signal from the output of a power amplifier in first radio to determine when the first radio is transmitting.

FIG. 2 is a block diagram illustrating an example of an apparatus 200 with multiple radios 102, 104. In the example illustrated in FIG. 2, the first radio 102 comprises a transmitter 202. The transmitter 202 of the first radio 102 comprises a power amplifier 204. The second radio 104 comprises a receiver 206, a counter register 210 that receives the signal 106 from a sensor 212 coupled with the output of the power amplifier 204 of the first radio 104, and channel monitoring logic 208 that is coupled with the receiver 206 and the counter register 210. The sensor 212 determines whether the power amplifier 204 is transmitting. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, counter/register may indicate whether the first radio 102 transmitted at any time during a time period and/or for how long the first radio 102 transmitted during the time period. For example, the counter/register may set a bit if the power amplifier 102 transmitted any data any time during a time period (e.g., a sampling period). In another embodiment, whenever the counter/register 210 receives an indication from signal 106 that the power amplifier 204 is transmitting, a counter is activated. Based on the value of the counter, the channel monitoring logic 208 can determine whether the power amplifier 204 was transmitting for longer than a predetermined threshold, and whether to discard measurements made by receiver 210 during the current sampling period.

Figure 3:
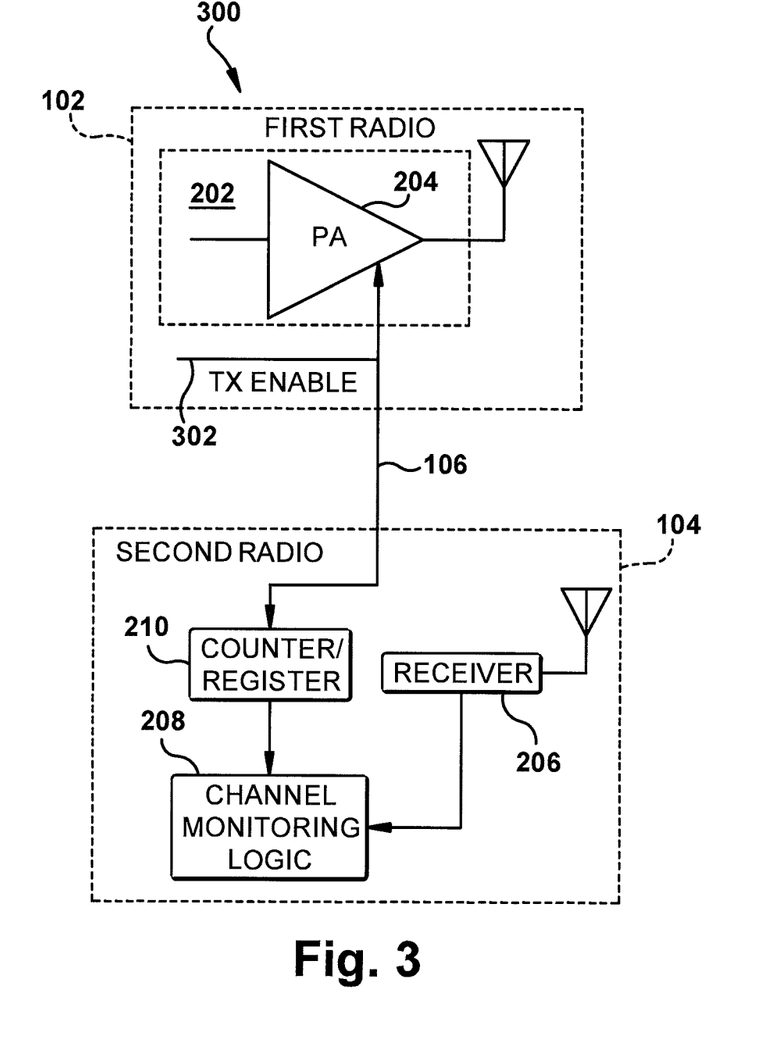
FIG. 3 is a block diagram illustrating an example of an apparatus with multiple radios where the second radio comprises a counter/register and obtains a signal derived from the output enable signal for a power amplifier in the first radio to determine when the first radio is transmitting.

FIG. 3 is a block diagram illustrating an example of an apparatus 300 with multiple radios 102, 104 where the second radio 104 comprises a counter/register 210 and obtains a signal 106 from a transmit enable signal 302 of a power amplifier 204 in the first radio 102 to determine when the first radio is transmitting. Those skilled in the art should readily appreciate that such a signal could also come from a Transmit/Receiver (T/R) switch, or any other circuit that might disable or attenuate the transmission from this first radio. Moreover, the latency for the propagation of such a signal between the radios would usually be much less than the propagation of the wireless signal over the air, and that the measurements taken by the receiver might include further processing delays. As such, any such signal might have hysteresis applied to extend the signal so as to account for such delays and align the blanking to include any such receiver artifacts.

In an example embodiment, counter/register may indicate whether the first radio 102 transmitted at any time during a time period and/or for how long the first radio 102 transmitted during the time period. For example, the counter/register may set a bit if the transmit enable signal 302 was active any time during a time period (e.g., a sampling period). In another embodiment, whenever the counter/register 210 receives an indication from signal 106 that the transmit enable signal 302 was active, a counter is activated to measure the duration of the transmission(s). It is to be appreciated however that a signal such as the transmit enable signal could also come from a T/R switch, or any other circuit that might disable or attenuate the transmission from this first radio. Based on the value of the counter, the channel monitoring logic 208 can determine whether the first radio 102 transmitted for longer than a predetermined threshold, and whether to discard measurements made by receiver 210 during the current sampling period.

Figure 4:
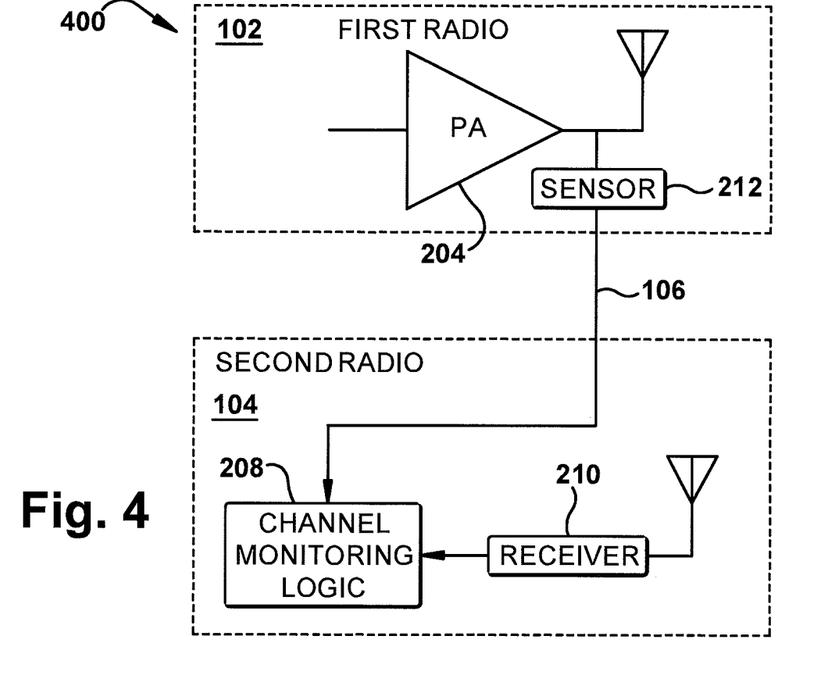
FIG. 4 is a block diagram illustrating an example of an apparatus with multiple radios where the second radio obtains a signal from the output of a power amplifier in the first radio to determine when the first radio is transmitting.

FIG. 4 is a block diagram illustrating an example of an apparatus 400 with multiple radios 102, 104 where the channel monitoring logic 208 of the second radio 104 obtains the signal 106 from the output of a power amplifier 204 in first radio 102 to determine when the first radio is transmitting. In this embodiment, the channel monitoring logic 208 discards (or ignores) any measurements made by the receiver 210 when the signal 106 obtained from the output of the power amplifier 204 indicates that the first radio 102 was transmitting.

Figure 5:
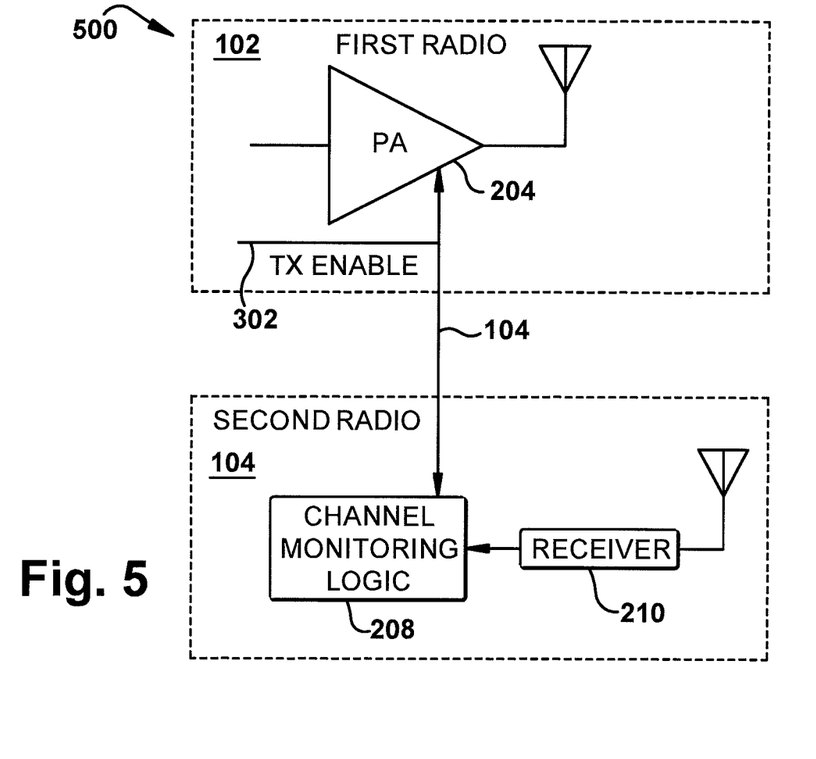
FIG. 5 is a block diagram illustrating an example of an apparatus with multiple radios where the second radio obtains a signal from a transmit enable signal of a power amplifier in the first radio to determine when the first radio is transmitting.

FIG. 5 is a block diagram illustrating an example of an apparatus 500 with multiple radios 102, 104 where the second radio 104 obtains a signal from a transmit enable signal 302 of a power amplifier 204 in the first radio 102 to determine when the first radio 102 is transmitting. In this embodiment, the channel monitoring logic 208 discards (or ignores) any measurements made by the receiver 210 when the signal 106 obtained from the transmit enable signal 302 of the power amplifier 204 indicates that the first radio 102 was transmitting. It is to be appreciated however that a signal such as the transmit enable signal could also come from a T/R switch, or any other circuit that might disable or attenuate the transmission from this first radio.

Although the example embodiments described in FIGS. 1-5 depict an apparatus with two co-located radios, those skilled in the art should readily appreciate that the principles of the example embodiments described herein may be employed with apparatuses having any physically realizable number of radios. Moreover, although the first radio 102 is described as having a transmitter, those skilled in the art can readily appreciate that the first radio may further comprise a receiver. Similarly, although the second radio 104 is described as having a receiver, those skilled in the art can readily appreciate that the second radio may further comprise a transmitter.

Figure 6:
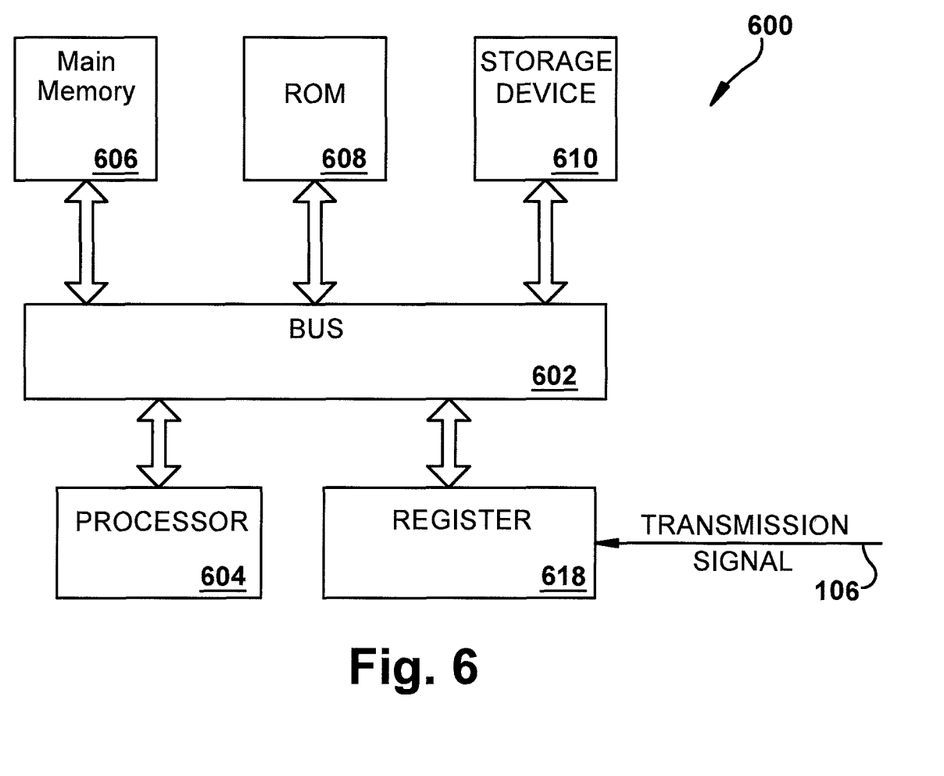
FIG. 6 is a block diagram illustrating an example of a computer system upon which an example embodiment may be implemented.

FIG. 6 is a block diagram illustrating an example of a computer system 600 upon which an example embodiment may be implemented. The computer system 600 may be employed to implement the functionality of channel monitoring logic 208 of the second radio 104.

Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk, optical disk, and/or flash storage, is provided and coupled to bus 602 for storing information and instructions.

An aspect of the example embodiment is related to the use of computer system 600 for obtaining accurate measurements of a channel parameter by a radio associated with a multi-radio device with a co-located interfering radio. According to an example embodiment, obtaining accurate measurements of a channel parameter by a radio associated with a multi-radio device with a co-located interfering radio is provided by the computer system 600 in response to the processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 600 also includes a register 618 coupled to bus 602. Register 618 provides communication coupling computer system 600 to a co-located radio that provides a signal 106 indicating when the co-located radio is transmitting, allowing computer system 600 to determine when to discard (or ignore) channel parameter measurements.

Figure 7:
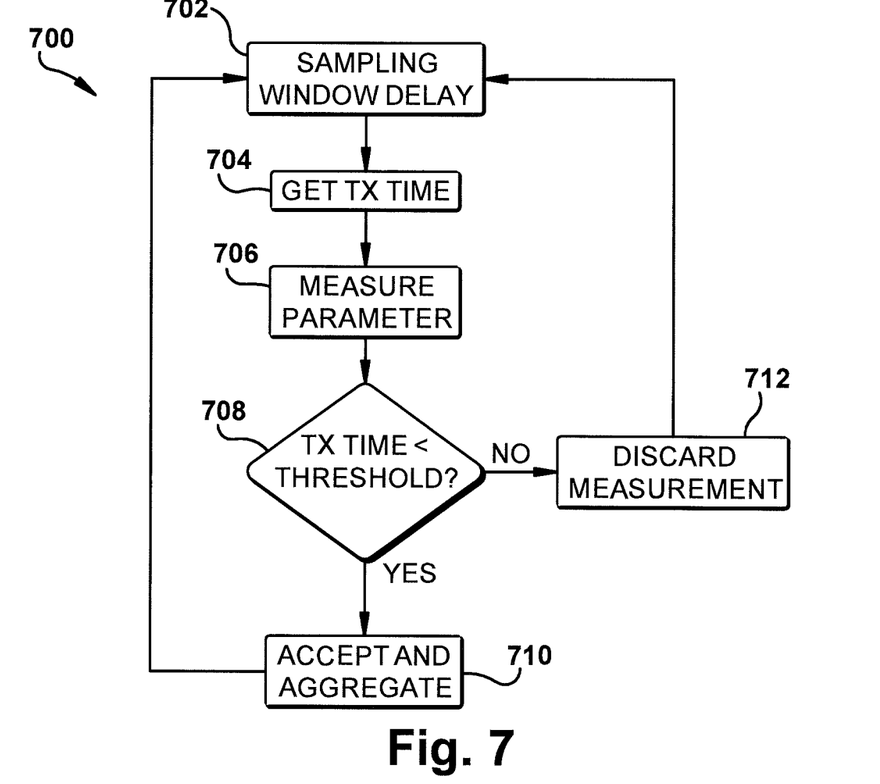
FIG. 7 is a block diagram of a methodology for determining whether to accept measurements by a radio where there is a co-located interfering radio based on a threshold.
Figure 8:
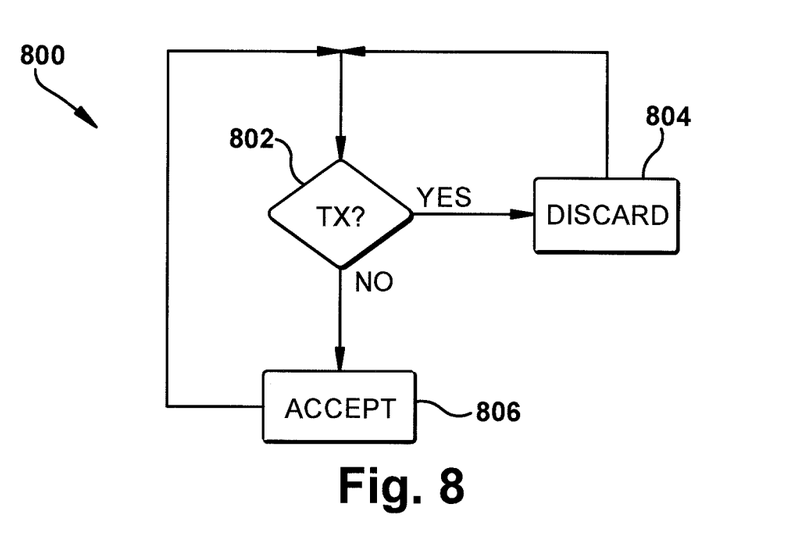
FIG. 8 is a block diagram of a methodology for determining whether to accept measurements by a radio where there is a co-located interfering radio based on whether the co-located radio is transmitting.

In view of the foregoing structural and functional features described above, methodologies in accordance with example embodiment will be better appreciated with reference to FIGS. 7 and 8. While, for purposes of simplicity of explanation, the methodologies of FIGS. 7 and 8 are shown and described as executing serially, it is to be understood and appreciated that the example embodiment are not limited by the illustrated orders, as some aspects could occur in different orders and/or concurrently with other aspects shown and described herein. Moreover, not all of the illustrated features may be required to implement the methodologies described herein. The methodology described herein is suitably adapted to be implemented in hardware, software when executed by a processor, or a combination thereof.

FIG. 7 is a block diagram of a methodology 700 for determining whether to accept measurements by a (first) radio with a co-located interfering (second) radio based on a threshold. As used herein, a co-located radio is a radio within a predefined proximity of the radio (e.g., the second radio or receiver) measuring the channel parameter that provides a signal to the radio measuring the channel parameter (e.g., the second radio) indicating when the first radio is transmitting.

At 702, the methodology 700 waits for a sampling window delay (e.g. sampling time period). The sampling window may be any suitable time period.

At 704, the amount of time a co-located radio (e.g., a first radio) was transmitting during the sampling window delay is obtained. For example, as described herein, a counter may be employed to track how long during the sampling period the co-located (first) radio was transmitting.

At 706, a measurement of a channel parameter made by a receiver is obtained. The channel parameter may be any suitable parameter such as CCA, noise floor, BER, PER, etc.

At 708, a determination is made whether the amount of time the co-located (e.g., first) radio exceed a predetermined threshold. The predetermined threshold may be any suitable value. For example, the threshold may be based on the percentage of the sampling window (e.g., 10%). As another example, the threshold can be zero (e.g., did the co-located radio transmit at any time during the sampling window).

If, at 708, the time that the co-located radio transmitted (TX) is less than the threshold (YES), at 710 the measurements made by the receiver is accepted. In particular embodiments, the measurements may also be aggregated (e.g., 1 ms window samples may be aggregated for a 1 second time period). As described herein, an average of the measurements may be obtained based on the aggregate of acceptable measurements divided by the number of sampling windows providing acceptable measurements. It is to be appreciated that other forms of filtering of the measurements might be equally be applied, such as a median, standard deviation, an IIR filter, generating a histogram of values within different buckets, or any other statistical processing of the aggregated measurements. It should also be possible to suppress generating of a metric when insufficient samples are aggregated as to be statistically significant. This might take the form of not generating a measurement for that time period, or to increase the time period going backwards until some minimal number of samples were available.

If, at 708, the transmission time of the co-located radio was not less than (e.g., greater) than the predetermined threshold (NO), at 712, the measurements are discarded. In particular embodiments, the minimal acceptable value for a measurement (e.g., the threshold for CCA and/or noise floor) is increased if the transmission time of the co-located radio was not less than the predetermined threshold, and measurements below the acceptable value are discarded.

FIG. 8 is a block diagram of a methodology 800 for determining whether to accept measurements associated with a channel based on whether a co-located radio is transmitting. In this embodiment, measurements are discarded as they are received, as opposed to measurements during a sampling window as described in FIG. 7.

At 802, a determination is made whether the co-located (e.g., first) radio is transmitting. For example, as described herein, the (e.g., second) radio measuring the channel parameter can receive a signal from the first radio that indicates when the first radio is transmitting.

If, at 802, the co-located radio is determined to be transmitting (YES), at 804, measurements made by the receiving radio are discarded. If, however, at 802, the co-located radio is determined not to be transmitting (NO), the measurements are accepted. Because there are gaps in the time period where measurements are made, the measurements during times that the co-located radio is transmitting may be estimated by any suitable means, such as by interpolation using the accepted measurements.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally and equitably entitled.

In view of the foregoing, the scope of the present disclosure is determined by the claims that follow.

We claim:

1. A multi-radio device, comprising:
a first radio comprising a transmitter; and
a second radio comprising a receiver and configured to:
monitor, using the receiver, a channel to obtain data representative of measurements of a predefined channel parameter;
receive, using a communication path distinct from a wireless communication path between the first and second radios, a signal from the first radio providing data indicating whether the transmitter of the first radio is transmitting;
determine, based on the received signal, a length of time that the transmitter was transmitting during a first sampling period for a first measurement of the predefined channel parameter; and
based on the determined length of time relative to a duration of the first sampling period, selectively exclude the first measurement.

2. The multi-radio device set forth in claim 1, wherein selectively excluding the first measurement comprises:
discarding the data representative of the first measurement.

3. The multi-radio device set forth in claim 2,
wherein the second radio obtains data representative of the measurements of the predefined channel parameter during a predefined time period comprising a plurality of discrete sampling periods including the first sampling period; and
wherein the second radio ignores the first measurement and considers a second measurement of the predefined channel parameter obtained during a second sampling period of the plurality of discrete sampling periods.

4. The multi-radio device set forth in claim 1,
wherein the second radio further comprises a counter storing a counter value indicating the length of time the transmitter was transmitting during the first sampling period; and
wherein selectively excluding the first measurement comprises ignoring the first measurement responsive to determining the counter value is above a predetermined threshold value.

5. The multi-radio device set forth in claim 4,
wherein the second radio aggregates data representative of the measurements of the predefined channel parameter for a first predetermined time period that comprises a plurality of sampling periods including the first sampling period; and
wherein the second radio determines a representation of the aggregated data representative of the measurements of the predefined channel parameter by filtering the aggregated data and determining a number representative of good samples obtained during the plurality of sampling periods.

6. The multi-radio device set forth in claim 5, wherein the second radio determines an average channel parameter from a plurality of predetermined time periods including the first predetermined time period.

7. The multi-radio device set forth in claim 1,
wherein the transmitter comprises a power amplifier; and
wherein the signal provided to the second radio is derived from an output of the power amplifier.

8. The multi-radio device set forth in claim 7,
wherein the first radio further comprises a sensor device coupled with the output of the power amplifier, and
wherein the second radio is coupled with the sensor device and receives the signal from the sensor device.

9. The multi-radio device set forth in claim 1,
wherein the transmitter comprises a power amplifier; and
wherein the signal provided to the second radio is derived from an output enable signal for switching power on to the power amplifier.

10. The multi-radio device set forth in claim 1, wherein the predefined channel parameter is one of a clear channel assessment, a noise floor, a bit error rate, and a packet error rate.

11. The multi-radio device set forth in claim 1,
wherein the second radio raises a threshold for ignoring measurements made while the transmitter is transmitting; and
wherein the second radio excludes measurements below the raised threshold.

12. The multi-radio device set forth in claim 1, wherein the first radio operates on a first channel within a band, and the second radio operates on a second channel within the band.

13. The multi-radio device set forth in claim 12, wherein the second radio selectively excludes the measurements of the predefined channel parameter obtained while the transmitter of the first radio is transmitting by discarding data for a portion of a transmit spectral mask of the first radio that is expected to overlap the second channel.

14. The multi-radio device set forth in claim 1, wherein the communication path distinct from the wireless communication path is conductive between the first and second radios.

15. The multi-radio device set forth in claim 1, wherein the signal received from the first radio indicates that the transmitter is disabled or attenuated.

16. Logic encoded in a non-transitory, tangible computer readable medium for execution by a processor, and when executed by the processor the logic being operable to:

obtain, from a receiver of an associated multi-radio device having one or more wireless receivers, first data representative of a measured channel parameter, wherein the first data is obtained during a predetermined sampling period;

obtain, using a communication path distinct from the one or more wireless receivers, second data indicating whether a co-located transmitter is transmitting;

determine, based on the second data, a length of time that the co-located transmitter was transmitting during the sampling period;

based on the determined length of time relative to a duration of the sampling period, selectively discard the first data representative of the measured channel parameter; and aggregate the first data representative of the measured channel parameter.

17. The logic set forth in claim 16, wherein selectively discarding the first data comprises:

discarding the first data responsive to determining the determined length of time is greater than a predetermined threshold.

18. The logic set forth in claim 17, wherein aggregating the first data representative of the measured channel parameter comprises aggregating the first data for a first predetermined time period comprising a plurality of sampling periods.

19. The logic set forth in claim 18, the logic being further operable to average the first data representative of the measured channel parameter for a plurality of predetermined time periods comprising the first predetermined time period.

20. A method, comprising:

obtaining a plurality of measurements of a channel parameter by a receiver of one or more wireless receivers of a multi-radio device;

receiving, using a communication path distinct from the one or more wireless receivers, a signal indicating whether a transmitter that is co-located with the receiver is transmitting;

determining, based on the received signal, a length of time that the transmitter was transmitting during a sampling period for a first measurement of the plurality of measurements;

based on the determined length of time relative to a duration of the sampling period, ignoring the first measurement; and aggregating the plurality of measurements of the channel parameter.

21. The method of claim 20, wherein ignoring the first measurement comprises:

raising a threshold for the plurality of measurements of the channel parameter while the transmitter is transmitting; and, ignoring one or more measurements of the channel parameter that are below the raised threshold.

* * * * *